US009646585B2

(12) United States Patent
Ikeda et al.

(10) Patent No.: US 9,646,585 B2
(45) Date of Patent: May 9, 2017

(54) INFORMATION PROCESSING APPARATUS, INFORMATION PROCESSING METHOD, AND PROGRAM

(75) Inventors: Tetsuo Ikeda, Tokyo (JP); Yasuyuki Koga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1197 days.

(21) Appl. No.: 13/270,822

(22) Filed: Oct. 11, 2011

(65) Prior Publication Data

US 2012/0323559 A1 Dec. 20, 2012

(30) Foreign Application Priority Data

Oct. 15, 2010 (JP) ................................ P2010-232909

(51) Int. Cl.
*G06F 17/27* (2006.01)
*G10H 1/00* (2006.01)

(52) U.S. Cl.
CPC ..... *G10H 1/0008* (2013.01); *G10H 2210/061* (2013.01); *G10H 2220/011* (2013.01); *G10H 2240/131* (2013.01)

(58) Field of Classification Search
CPC .... G10H 1/368; G10H 2210/066; G10H 1/38; G10H 2240/056; G10H 2220/011; G10H 2240/141; G10H 2210/101; G10L 25/48; G10L 25/90; G10L 13/027; G10L 25/15
USPC ..... 704/1–10, 251, 255, 257, 270, 272, 206, 704/278; 707/5, 749; 701/539
See application file for complete search history.

(56) References Cited

U.S. PATENT DOCUMENTS 7,228,229 B2 * 6/2007 Odagawa et al. ............ 701/539
2007/0193437 A1 8/2007 Kong et al.
2009/0307207 A1 * 12/2009 Murray ............................ 707/5
2010/0161622 A1 * 6/2010 Hattori et al. ................ 707/749

FOREIGN PATENT DOCUMENTS

EP 2 096 626 9/2009
JP 2003-271160 9/2003

OTHER PUBLICATIONS

Wang, et al., "LyricAlly: Automatic Synchronization of Acoustic Musical Signals and Textual Lyrics", Proceeding ACM Multimedia, Oct. 10, 2004, pp. 1-8.

* cited by examiner

*Primary Examiner* — Huyen Vo
(74) *Attorney, Agent, or Firm* — Paratus Law Group, PLLC

(57) ABSTRACT

An apparatus is provided for determining a lyric importance level, comprising a memory and a processor executing instructions stored in the memory. The processor executes instructions stored in the memory to acquire lyric information, the lyric information identifying: lyrics of a song; and lyric location information indicating locations of the lyrics within the song. The processor further executes instructions stored in the memory to acquire section information, the section information identifying: sections of the song; section importance levels corresponding to the sections; and section location information indicating locations of the sections within the song. The processor still further executes instructions stored in the memory to identify, based on the lyric location information and the section location information, one or more sections corresponding to a subset of the lyrics; and determine, based on the section importance levels, a lyric importance level of the subset.

23 Claims, 18 Drawing Sheets

FIG.3

30

TRACK NAME: SAKURA SAKURA
ALBUM NAME: SAKURA
ARTIST NAME: AAA
LYRICS BY: BBB
MUSIC BY: CCC

[00:14] SAKURA SAKURA (CHERRY BLOSSOMS, CHERRY BLOSSOMS)
[00:16] YAYOI NO SORA WA (SKY IN MARCH)
[00:22] MIWATASU KAGIRI (AS FAR AS WE OVERLOOK)
[00:25] KASUMI KA KUMO KA (MIST OR CLOUD)
[00:30] NIOI ZO IZURU (SCENTED)
[00:34] IZA YA IZA YA (NOW)
[00:38] MI NI YUKAN KOISHITERU (LET'S GO TO TAKE A LOOK, I AM IN LOVE)
[00:43] SAKURA SAKURA (CHERRY BLOSSOMS, CHERRY BLOSSOMS)
[00:48] NOYAMA MO SATO MO (IN MOUNTAINS AND VILLAGES)
[00:56] MIWATASU KAGIRI (AS FAR AS WE OVERLOOK)
[01:02] KASUMI KA KUMO KA (MIST OR CLOUD)
[01:15] ASAHI NI NIOU (SCENTED UNDER RISING SUN)
[01:17] SAKURA SAKURA (CHERRY BLOSSOMS, CHERRY BLOSSOMS)
[01:24] HANA ZAKARI KOISHITERU (IN FULL BLOOM, I AM IN LOVE)
[01:31] SAKURA SAKURA (CHERRY BLOSSOMS, CHERRY BLOSSOMS)
[01:35] YAYOI NO SORA WA (SKY IN MARCH)
[01:40] MIWATASU KAGIRI (AS FAR AS WE OVERLOOK)
[01:45] KASUMI KA KUMO KA (MIST OR CLOUD)
[01:50] NIOI ZO IZURU (SCENTED)
[01:58] IZA YA IZA YA (NOW)
[02:03] MI NI YUKAN KOISHITERU (LET'S GO TO TAKE A LOOK, I AM IN LOVE)
[02:08] SAKURA SAKURA (CHERRY BLOSSOMS, CHERRY BLOSSOMS)
[02:17] NOYAMA MO SATO MO (IN MOUNTAINS AND VILLAGES)
[02:27] MIWATASU KAGIRI (AS FAR AS WE OVERLOOK)
[02:31] KASUMI KA KUMO KA (MIST OR CLOUD)
[02:35] ASAHI NI NIOU (SCENTED UNDER RISING SUN)
[02:40] SAKURA SAKURA (CHERRY BLOSSOMS, CHERRY BLOSSOMS)
[02:45] HANA ZAKARI KOISHITERU (IN FULL BLOOM, I AM IN LOVE)
[02:53] SAKURA SAKURA (CHERRY BLOSSOMS, CHERRY BLOSSOMS)
[02:58] HANA ZAKARI KOISHITERU (IN FULL BLOOM, I AM IN LOVE)

32 31

FIG.5

| MUSIC COMPOSITION CONFIGURATION | WEIGHT COEFFICIENT |
|---|---|
| MELODY A | 1 |
| MELODY B | 1 |
| MELODY C | 1 |
| HOOK LINE (FIRST TIME) | 3 |
| HOOK LINE (OTHERS) | 2 |
| OTHERS | 1 |

| OVERALL INFORMATION | WEIGHT COEFFICIENT |
|---|---|
| MUSIC COMPOSITION TITLE | 3 |
| ALBUM TITLE | 2 |
| ARTIST NAME | 1 |

FIG.7

30

TRACK NAME: SAKURA SAKURA
ALBUM NAME: SAKURA
ARTIST NAME: AAA
LYRICS BY: BBB
MUSIC BY: CCC

| | | |
|---|---|---|
| [00:14]<br>[00:16]<br>[00:22] | SAKURA SAKURA (CHERRY BLOSSOMS, CHERRY BLOSSOMS)<br>YAYOI NO SORA WA (SKY IN MARCH)<br>MIWATASU KAGIRI (AS FAR AS WE OVERLOOK) | MELODY A |
| [00:25]<br>[00:30] | KASUMI KA KUMO KA (MIST OR CLOUD)<br>NIOI ZO IZURU (SCENTED) | MELODY B |
| [00:34]<br>[00:38] | IZA YA IZA YA (NOW)<br>MI NI YUKAN KOISHITERU (LET'S GO TO TAKE A LOOK, I AM IN LOVE) | HOOK LINE |
| [00:43]<br>[00:48]<br>[00:56] | SAKURA SAKURA (CHERRY BLOSSOMS, CHERRY BLOSSOMS)<br>NOYAMA MO SATO MO (IN MOUNTAINS AND VILLAGES)<br>MIWATASU KAGIRI (AS FAR AS WE OVERLOOK) | MELODY A |
| [01:02]<br>[01:15] | KASUMI KA KUMO KA (MIST OR CLOUD)<br>ASAHI NI NIOU (SCENTED UNDER RISING SUN) | MELODY B |
| [01:17]<br>[01:24] | SAKURA SAKURA (CHERRY BLOSSOMS, CHERRY BLOSSOMS)<br>HANA ZAKARI KOISHITERU (IN FULL BLOOM, I AM IN LOVE) | HOOK LINE |
| [01:31]<br>[01:35]<br>[01:40] | SAKURA SAKURA (CHERRY BLOSSOMS, CHERRY BLOSSOMS)<br>YAYOI NO SORA WA (SKY IN MARCH)<br>MIWATASU KAGIRI (AS FAR AS WE OVERLOOK) | MELODY A |
| [01:45]<br>[01:50] | KASUMI KA KUMO KA (MIST OR CLOUD)<br>NIOI ZO IZURU (SCENTED) | MELODY B |
| [01:58]<br>[02:03] | IZA YA IZA YA (NOW)<br>MI NI YUKAN KOISHITERU (LET'S GO TO TAKE A LOOK, I AM IN LOVE) | HOOK LINE |
| [02:08]<br>[02:17]<br>[02:27] | SAKURA SAKURA (CHERRY BLOSSOMS, CHERRY BLOSSOMS)<br>NOYAMA MO SATO MO (IN MOUNTAINS AND VILLAGES)<br>MIWATASU KAGIRI (AS FAR AS WE OVERLOOK) | MELODY A |
| [02:31]<br>[02:35] | KASUMI KA KUMO KA (MIST OR CLOUD)<br>ASAHI NI NIOU (SCENTED UNDER RISING SUN) | MELODY B |
| [02:40]<br>[02:45] | SAKURA SAKURA (CHERRY BLOSSOMS, CHERRY BLOSSOMS)<br>HANA ZAKARI KOISHITERU (IN FULL BLOOM, I AM IN LOVE) | HOOK LINE |
| [02:53]<br>[02:58] | SAKURA SAKURA (CHERRY BLOSSOMS, CHERRY BLOSSOMS)<br>HANA ZAKARI KOISHITERU (IN FULL BLOOM, I AM IN LOVE) | HOOK LINE |

FIG. 8

| EXPRESSION | WORD CLASS | PHRASE |
|---|---|---|
| SAKURA (CHERRY BLOSSOMS) | NOUN | NOUN PHRASE |
| SAKURA (CHERRY BLOSSOMS) | NOUN | NOUN PHRASE |
| YAYOI (MARCH) | NOUN | NOUN PHRASE |
| NO (OF) | POSTPOSITION | |
| SORA (SKY) | NOUN | NOUN PHRASE |
| WA | POSTPOSITION | |
| MIWATA (OVERLOOK) | VERB | VERB PHRASE |
| SU | ADVERB | |
| KAGIRI (AS FAR AS) | POSTFIX | |
| KASUMI (MIST) | NOUN | NOUN PHRASE |
| KA (OR) | POSTPOSITION | |
| KUMO (CLOUD) | NOUN | NOUN PHRASE |
| KA | POSTPOSITION | |
| NIOI (SCENT) | NOUN | NOUN PHRASE |
| ZO | POSTPOSITION | |
| IZU (OUTCOME) | VERB | VERB PHRASE |
| RU | AUXILIARY VERB | |

FIG.10

100

| EXPRESSION | IMPORTANCE |
|---|---|
| SAKURA (CHERRY BLOSSOMS) | 10 |
| KOI (IN LOVE) | 9 |
| IZA (NOW) | 6 |
| HANAZAKARI (IN FULL BLOOM) | 6 |
| KASUMI (MIST) | 4 |
| KUMO (CLOUD) | 4 |
| YAYOI (MARCH) | 2 |
| ⋮ | ⋮ |

INFORMATION PROCESSING APPARATUS, INFORMATION PROCESSING METHOD, AND PROGRAM

RELATED APPLICATION

The present disclosure contains subject matter related to that disclosed in Japanese Priority Patent Application JP 2010-232909 filed in the Japan Patent Office on Oct. 15, 2010, the entire contents of which are hereby incorporated by reference.

FIELD

The present disclosure relates to an information processing apparatus capable of processing lyric information of a music composition, an information processing method and a program in the information processing apparatus.

BACKGROUND

Lyrics of music have heretofore been used in various applications. For example, a lyric information display application in karaoke displays the lyrics of a music composition as caption on a display along with the progress of backing during the reproduction of backing sound for the music. At this time, the color of the characters of the lyrics to be sung by the singer is displayed with a different color from the color of the characters of the lyrics of the other parts in some cases in order to support the singer.

According to the application in related art, however, the displayed lyric information is undifferentiated, the message that the music composer desires to deliver, such as important words in the lyrics, is hardly reflected.

JP-A-2003-271160 discloses a music composition search apparatus capable of dividing music lyric data into units of words by morpheme analysis, extracting predetermined words, calculating weighting coefficients indicating to what extent the extracted words have frequency of use, and arranging each music composition in an information space with the use of the weighting coefficients.

SUMMARY

It is considered that the technique disclosed in JP-A-2003-271160 is applied to the lyric information display application and the words with large weighting coefficients are displayed while distinguished from the other words in the lyric information. According to the technique disclosed in JP-A-2003-271160, however, words which are not important but have high frequency of use in the music composition are extracted due to the weighting processing only based on the frequency of use of the words, and the message that the music composer desires to deliver is not sufficiently reflected.

It is desirable to provide an information processing apparatus, an information processing method, and a computer-readable medium capable of extracting important expressions reflecting the message that the music composer desires from the lyric information, in view of the above circumstances.

Accordingly, there is provided an apparatus for determining a lyric importance level, including a memory and a processor executing instructions stored in the memory. The processor executes instructions stored in the memory to acquire lyric information, the lyric information identifying lyrics of a song and lyric location information indicating locations of the lyrics within the song. The processor further executes instructions stored in the memory to acquire section information, the section information identifying sections of the song, section importance levels corresponding to the sections, and section location information indicating locations of the sections within the song. The processor still further executes instructions stored in the memory to identify, based on the lyric location information and the section location information, one or more sections corresponding to a subset of the lyrics; and to determine, based on the section importance levels, a lyric importance level of the subset.

In another embodiment, there is provided a method for determining a lyric importance level. The method includes acquiring lyric information, the lyric information identifying lyrics of a song and lyric location information indicating locations of the lyrics within the song. The method further includes acquiring section information, the section information identifying sections of the song, section importance levels corresponding to the sections, and section location information indicating locations of the sections within the song. The method still further includes identifying, based on the lyric location information and the section location information, one or more sections corresponding to a subset of the lyrics; and determining, based on the section importance levels, a lyric importance level of the subset.

In still another embodiment, there is provided a non-transitory computer-readable medium storing instructions which, when executed by a computer, perform a method of determining a lyric importance level. The method includes acquiring lyric information, the lyric information identifying lyrics of a song and lyric location information indicating locations of the lyrics within the song. The method further includes acquiring section information, the section information identifying sections of the song, section importance levels corresponding to the sections, and section location information indicating locations of the sections within the song. The method still further includes identifying, based on the lyric location information and the section location information, one or more sections corresponding to a subset of the lyrics; and determining, based on the section importance levels, a lyric importance level of the subset.

As described above, it is possible to extract important expressions reflecting the message that the music composer desires to deliver from the lyric information.

BRIEF DESCRIPTION OF THE DRAWINGS

FIG. 3 is a diagram showing an example of lyric information obtained by a mobile terminal according to an embodiment of the present disclosure;

FIG. 5 is a diagram setting information of weighting coefficients set for each melody section of music composition configuration information and for overall information according to an embodiment of the present disclosure;

FIG. 7 is a diagram showing a result of associating processing between lyric information and music composition configuration information by a mobile terminal according to an embodiment of the present disclosure;

FIG. 8 is a diagram showing an example of a result of morpheme analysis processing by a mobile terminal according to an embodiment of the present disclosure;

FIG. 10 is a diagram showing an example of an importance table as a result of executing importance calculation processing by a mobile terminal according to an embodiment of the present disclosure;

DETAILED DESCRIPTION

Hereinafter, description will be made of embodiments of the present disclosure with reference to the drawings.

[Hardware Configuration of Mobile Terminal]

Figure 1:
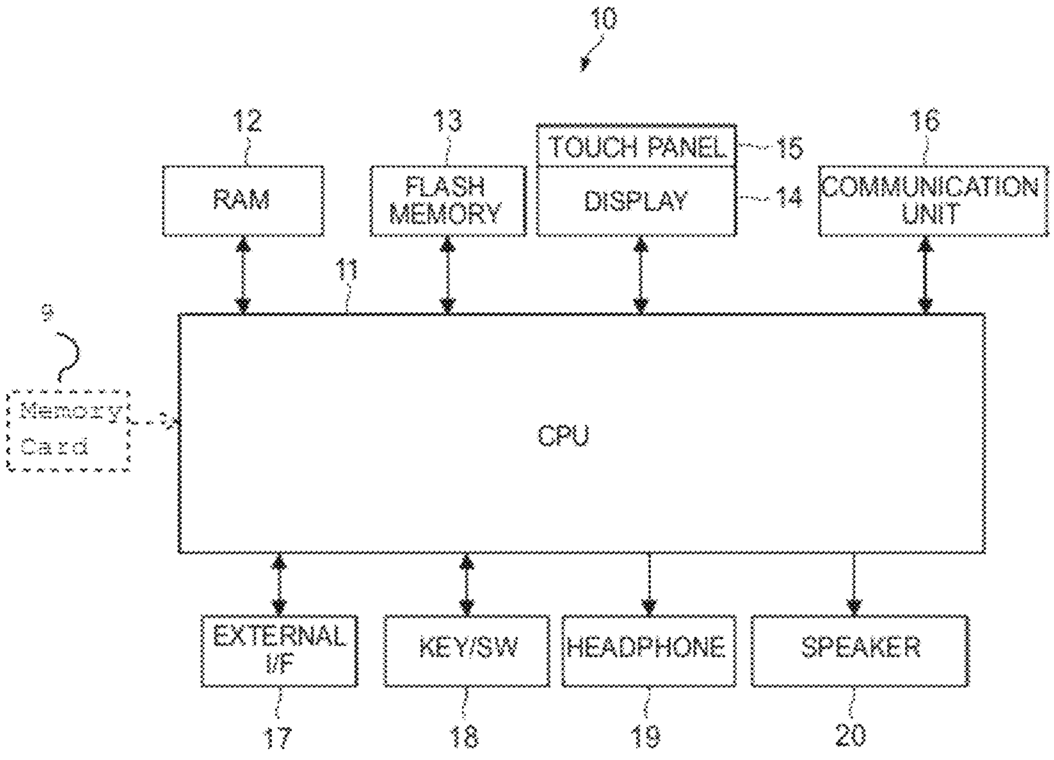
FIG. 1 is a block diagram showing a hardware configuration of a mobile terminal according to an embodiment of the present disclosure.

FIG. 1 is a block diagram showing a hardware configuration of a mobile terminal according to an embodiment of the present disclosure. The mobile terminal includes a mobile phone, a smart phone, a PDA (Personal Digital Assistant), a mobile AV player, an electronic book, an electronic dictionary, and the like.

This mobile terminal 10 includes a CPU 11, a RAM 12, a flash memory 13, a display 14, a touch panel 15, a communication unit 16, an external I/F (interface) 17, a key/switch unit 18, a headphone 19, and a speaker 20.

The CPU 11 performs various kinds of computation by communicating signals with each block of the mobile terminal 10 and performs overall control of the processing such as importance calculation processing for expressions in lyrics of a music composition as well as other functions disclosed herein, which will be described later, executed by a mobile terminal 10.

The RAM 12 is used as a work area of the CPU 11 and temporarily stores various kinds of data such as contents to be processed by the CPU 11 and programs such as an application for calculating the importance, a karaoke application using the calculated importance, and the like.

The flash memory 13 is an NAND type, for example, and stores data such as music composition data, lyric information, music composition configuration information (i.e., section information), and the like and various programs such as a control program executed by the CPU 11, the above each application, and the like. In addition, when each application above is executed, the flash memory 13 reads various data items such as lyric information, music composition configuration information, and the like for the execution to the RAM 12. The various programs may be stored in a non-transitory computer-readable medium such as a memory card 9, for example. Moreover, the mobile terminal 10 may include an HDD (Hard Disk Drive) as an additional storage apparatus instead of the flash memory 13.

The display 14 is an LCD (Liquid Crystal Display) or an OELD (Organic Electro-Luminescence Display), for example, and displays lyric information, background image, and the like as will be described later. In addition, the display 14 is integrally provided with the touch panel 15. The touch panel 15 detects a user's touch operation such as a selection operation of music composition data to be reproduced or the like and delivers the touch operation to the CPU 11. As the operation scheme of the touch panel 15, although a resistive scheme and capacitive scheme are employed for example, another scheme such as an electromagnetic induction scheme, a matrix switch scheme, a surface acoustic wave scheme, an infrared ray scheme, or the like may be employed.

The communication unit 16 includes an NIC (Network Interface Card), a modem, and the like to communicate with other devices through the network such as WAN (Wide Area Network) such as the Internet, or a LAN (Local Area Network). For example, the communication unit 16 is used for downloading music composition data including lyric information, and music composition configuration information from a music composition distribution server (not shown) on the Internet. The communication unit 16 may include a WLAN (Wireless LAN) module or a WWAN (Wireless WAN) module.

The external I/F (interface) 17 is connected to external devices such as a memory card based on various standards such as USB (Universal Serial Bus), HDMI (High-Definition Multimedia Interface), or the like for data communication. For example, the music composition data stored in another information processing apparatus is stored in the flash memory 13 through the external I/F 17.

The key/switch unit 18 receives user's operation of a power switch, a shortcut key, or the like which is not input through the touch panel 15 and delivers the input signal to the CPU 11.

The headphone 19 and the speaker 20 output an audio signal stored in the flash memory 13 or the like or input through the communication unit 16, the external I/F 17, or the like.

[Software Configuration of Mobile Terminal]

Figure 2:
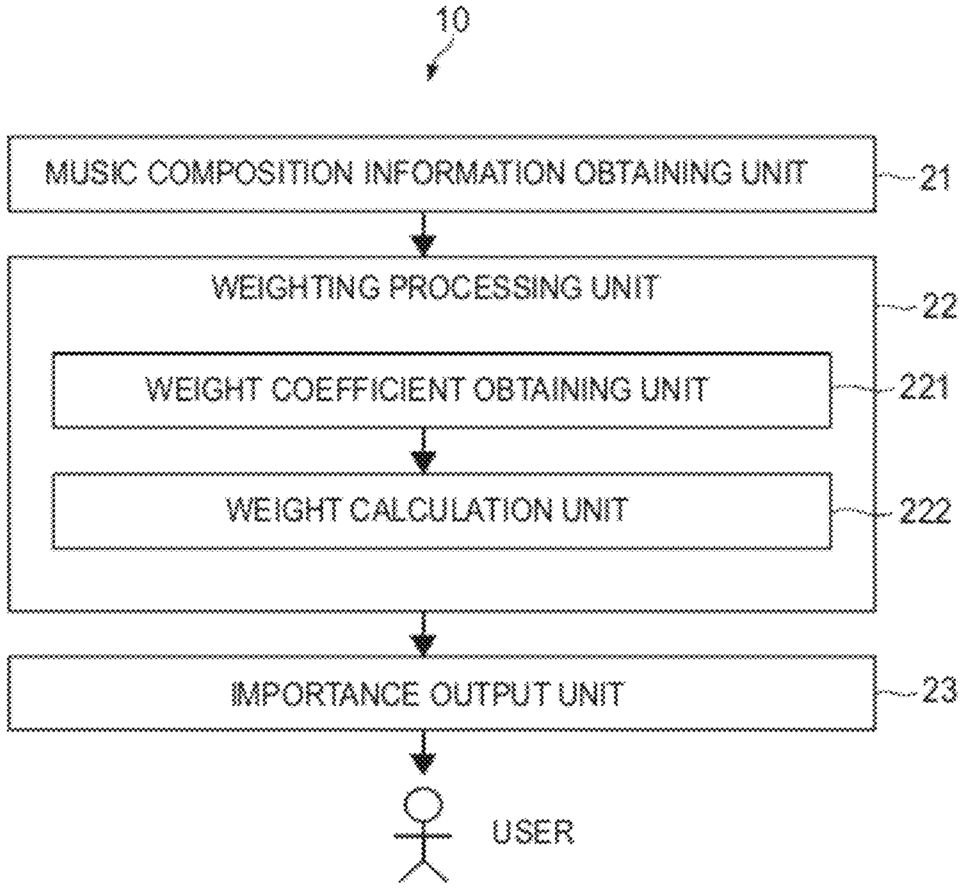
FIG. 2 is a block diagram showing a software configuration of a mobile terminal according to an embodiment of the present disclosure.

FIG. 2 is a block diagram showing a software configuration (functional configuration) of the mobile terminal 10 according to the embodiment of the present disclosure. As shown in the drawing, the mobile terminal 10 includes software modules such as a music composition information obtaining unit 21, a weighting processing unit 22, and an importance output unit 23.

The music composition information obtaining unit 21 obtains lyric information and music composition configuration information as meta-information of the music composition. The lyric information and the music composition configuration information will be described later in detail.

The weighting processing unit 22 includes a weight coefficient obtaining unit 221 and a weight calculation unit 222. The weight coefficient obtaining unit 221 obtains a weight coefficient corresponding to the music composition configuration information. The weight calculation unit 222 calculates the importance of expressions based on the weight coefficient obtained by the weight coefficient obtaining unit 221 and the appearance frequency of the expressions in the lyrics.

The importance output unit 23 outputs the thus calculated importance for each expression to the user in various manners.

The lyric information obtained by the music composition information obtaining unit 21 is included in the music composition data stored in the flash memory 13 or the like in some cases or exists as another file in other cases. When the music composition data is an MP3 file, for example, the lyric information is written in the music composition data as an ID3 tag. Even when the ID3 tag is not written in the music composition data, the lyric information is attached as an LRC file, for example, in some cases. When the music composition data is downloaded from a music composition distribution sever, the mobile terminal 10 downloads the music composition data as it is when the ID3 tag exists while the mobile terminal 10 downloads and stores the LRC file together in the flash memory 13 or the like when the attached LRC file exists.

FIG. 3 is a diagram showing an example of the lyric information. As shown in the drawing, the lyric information 30 includes a text unit 31 indicating character strings of the lyrics and a time unit 32 (i.e., lyric location information) representing what time point the lyrics corresponds to. In the example of the drawing, the lyrics on the first line shows that the character string “sakura sakura (cherry blossoms, cherry blossoms)” is sung from the time point corresponding to 14 seconds after the start of the music composition. The lyric information 30 shown in the drawing is just one example, and the detailed format is different depending on the file type. The text information and the time information can be obtained from any format.

Figure 4:
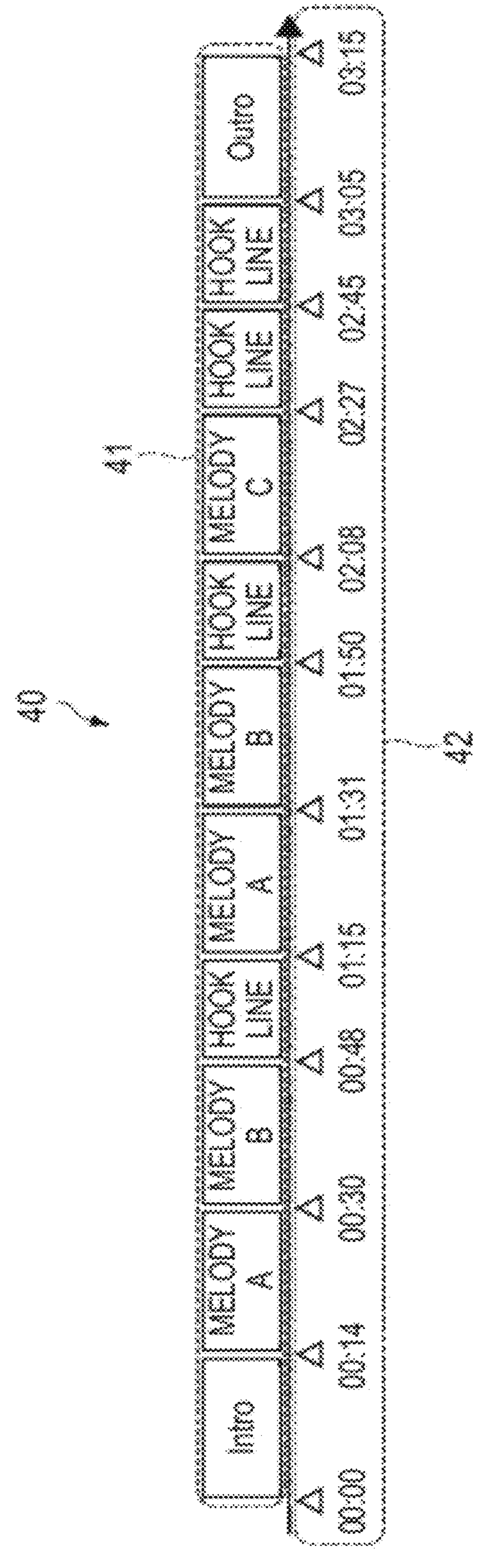
FIG. 4 is a diagram showing an example of music composition configuration information obtained by a mobile terminal according to an embodiment of the present disclosure.

FIG. 4 is a diagram showing an example of the music composition configuration information obtained by the music composition information obtaining unit 21. The music composition configuration information 40 represents the outline of the music composition configuration as time-series information. As shown in the drawing, the music composition configuration information 40 includes a music composition configuration unit 41 which represents a line of plural melody sections included in the music composition, such as introduction-melody A-melody B-hook line, or the like and a time unit 42 (i.e., section location information) which represents which position in the music composition the melody section corresponds to. In the example of the drawing, the melody A is sung at the time point of 14 seconds after the start of the music composition, and the hook line is sung at the time point of 48 seconds after the start.

Here, the hook line is a part (main melody) which is the most sensational part in the music composition, which is a different melody provided before or after the melody A or the melody B. Although the hook line appears after the melody A and the melody B in the example of the drawing, the music composition is configured in various manners, and the hook line appears the head, or the melody B does not exist in some cases.

As a technique for obtaining the music composition configuration information 40 from the music composition data, it is possible to exemplify a 12-sound analysis technique developed by the present inventor. The 12-sound analysis technique is a technique which makes it possible to obtain music feature information including beat, code, and melody, and variety of information characterizing a music composition such as at which point the vocal and the instrument playing are inserted and the like. Specifically, according to the 12-sound analysis technique, various kinds of information including music composition configuration information 40 are obtained by generating a two-dimensional image of time and music interval (12 music intervals) from the music composition and performing various signal processing and detection processing based on the two-dimensional image.

The mobile terminal 10 may obtain music composition configuration information 40 by performing analysis processing with the use of the 12-sound analysis processing on the music composition data stored in the flash memory 13 or the like or obtain the music composition configuration information 40 from an external database which accumulates music composition configuration information 40 obtained from various music compositions by the analysis processing, through the Internet. As such an external database, there is the database administered by Gracenote in the group of the inventor. The mobile terminal 10 can obtain the music composition configuration information 40 without performing analysis processing every time by referring to the database with the use of a key such as an artist name, a title name, or the like and storing the database in the flash memory 13 or the like.

In this embodiment, a weight coefficient (i.e., a section importance level) indicating the weight (importance) is set for each melody section (the melody A, the melody B, the hook line, or the like) included in the music composition configuration information 40, and the setting information of the weight coefficient is also stored in the flash memory 13 or the like. In addition, a weight coefficient is similarly set for overall information such as a music composition title, an album title, or the like as well as the music composition configuration information 40.

FIG. 5 is a diagram showing an example of the setting information of the weight coefficient set to each melody section of the music composition configuration information 40 and the overall information.

This setting of the weight coefficient is performed, focusing on the point that message the music composer desires to deliver is different in each melody section of the music composition configuration information 40. It is considered that the expressions used in a sensational part of the music composition such as a hook line among the lyrics reflects the message that the music composer desires to deliver. That is, an expression which appears once in the hook line has a higher importance than that of an expression which appears once in the melody A, for example, even if the expression is the same. Similarly, it is considered that an expression used in information other than the lyrics, such as the title of the music composition, the title of the album of the music composition, or the like also has high importance.

Accordingly, as shown in the drawing, a small weight coefficient (weight coefficient 1) is set for each of the flat melody sections such as the melody A, the melody B, the melody C, and the like from among the melody sections of the music composition configuration information 40. On the other hand, large weight coefficients (a weight coefficient 3 and a weight coefficient 2, respectively) are set for the first hook line which is the most sensational part of the music composition and for the second or later hook lines. In addition, a small weight coefficient (weight coefficient 1) is set to the other melody sections (such as introduction, outro, melody D, melody E, and the like).

In addition, large weight coefficients (a weight coefficient 3 and a weight coefficient 2, respectively) are set for the title of the music composition and the title of the album as overall information, and a small weight coefficient is set for the artist name.

The thus set weight coefficients are used in the importance calculation processing for the expressions in the lyrics, which will be described later.

[Operation of Mobile Terminal]

Next, description will be made of the operation of the mobile terminal 10 configured as described above. Although description will be made of the CPU 11 of the mobile terminal 10 as a main operation subject in the following description, these operations are performed in cooperation with other hardware shown in FIG. 1 and each software module shown in FIG. 2.

(Outline of Importance Calculation Processing)

Figure 6:
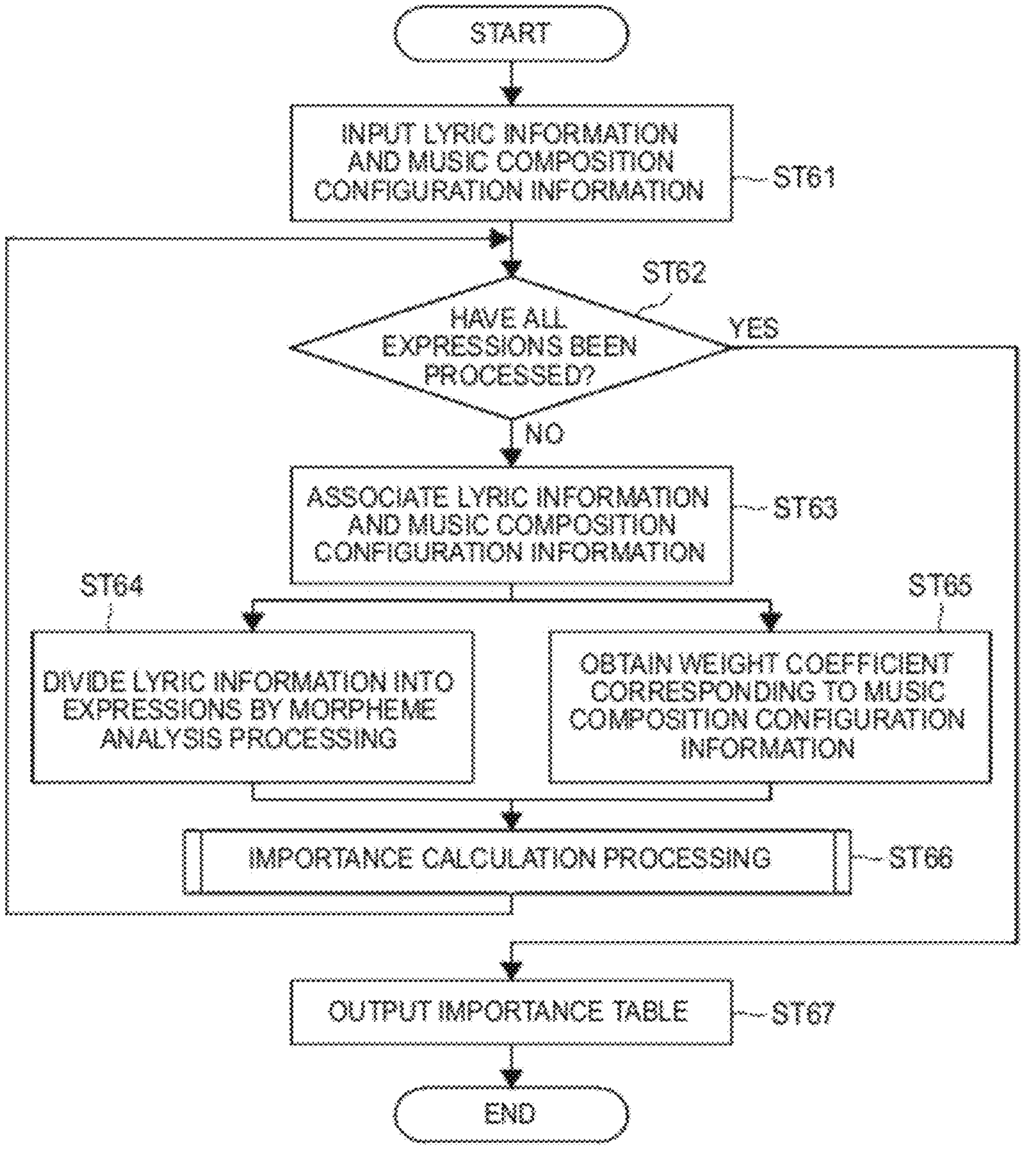
FIG. 6 is a flowchart showing an outline of flow of importance calculation processing for expressions in lyrics by a mobile terminal according to an embodiment of the present disclosure.

FIG. 6 is a flowchart showing an outline of flow of the importance calculation processing for expressions in the lyrics by the mobile terminal 10 according to this embodiment.

As shown in the drawing, the CPU 11 firstly reads the lyric information 30 and the music composition configuration information 40 of the music composition to be processed from the flash memory 13 or the like (Step 61). Next, the CPU 11 determines whether or not all the expressions in the text unit 31 of the lyric information 30 have been processed (Step 62).

When all expressions have not been processed yet (No in Step 62), the CPU 11 associates the lyric information 30 and the music composition configuration information 40 (Step 63). That is, the CPU 11 calculates which lyrics are included in which melody section by comparing the time units (the time unit 32 in FIG. 3 and the time unit 42 in FIG. 4) included in both the lyric information 30 and the music composition configuration information 40. FIG. 7 shows an association result for an example of the lyric information 30 shown in FIG. 3 and the music composition configuration information 40 shown in FIG. 4.

Subsequently, the CPU 11 divides the text unit 31 in the lyric information 30 into expressions by morpheme analysis processing (Step 64). FIG. 8 shows an example of the result of morpheme analysis processing execution for the lyrics in the first to fifth lines from among the text unit 31 in the lyric information 30 shown in FIGS. 3 and 7.

Then, the CPU 11 obtains the weight coefficient set for each melody section of the music composition information 40 shown in FIG. 5 from the flash memory 13 or the like (Step 65).

Figure 9:
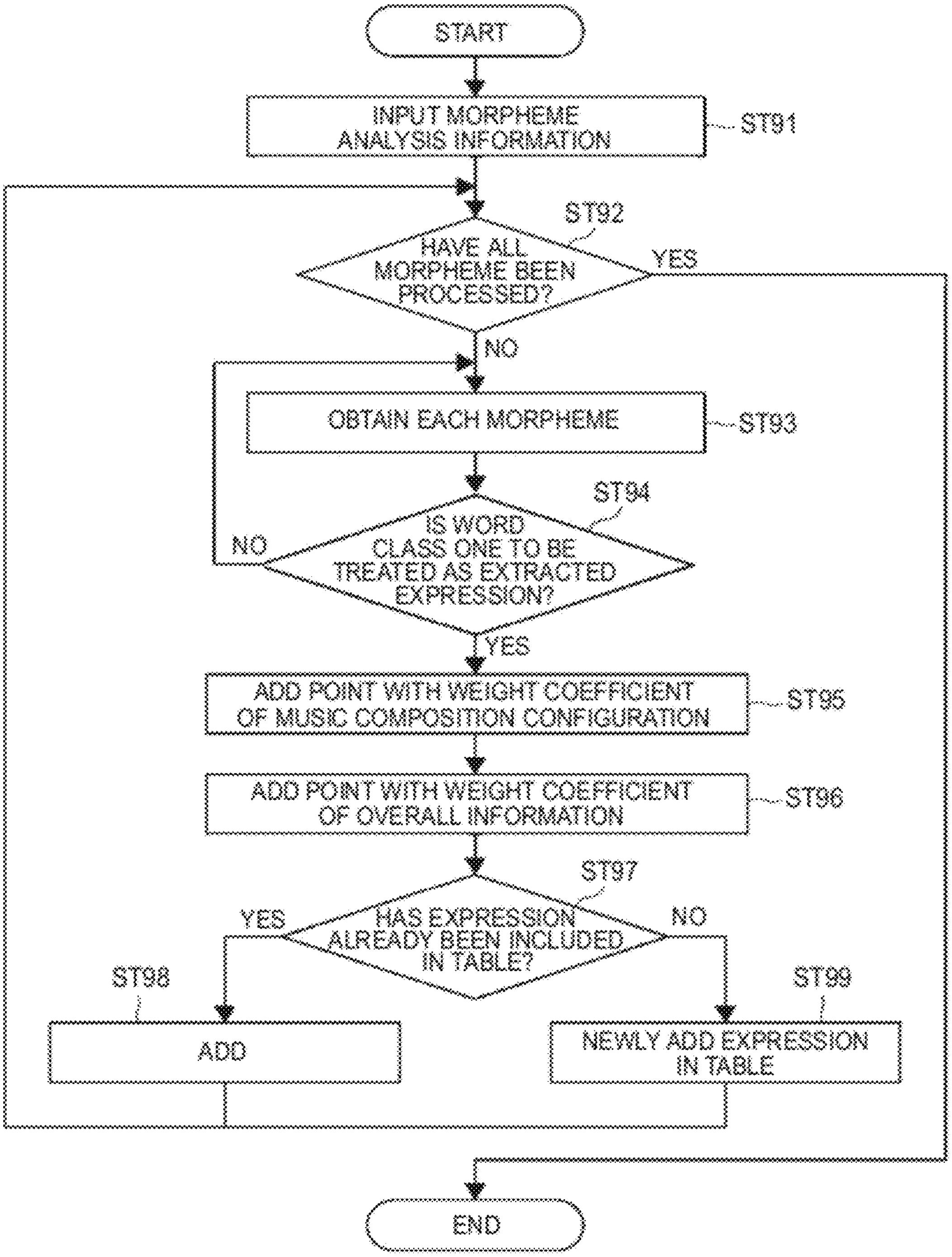
FIG. 9 is a flowchart showing detailed flow of importance calculation processing for expressions by a mobile terminal according to an embodiment of the present disclosure.

Subsequently, the CPU 11 executes the importance calculation processing for expressions based on the expressions divided in the morpheme analysis processing and the obtained weight coefficient for each melody section (Step 66). FIG. 9 is a flowchart showing a detailed flow of the importance calculation processing for expressions in Step 66.

(Detail of Importance Calculation Processing)

As shown in the drawing, the CPU 11 firstly inputs the morpheme analysis result (morpheme analysis information) (Step 91) and then determines whether the importance calculation processing has been performed on all morphemes (Step 92).

When the processing has not been completed for all morphemes (No in Step 92), the CPU 11 obtain the morpheme as a next processing target (Step 93) and determines whether or not the word class of the morpheme is a word class to be treated as an expression (i.e., a subset of the lyrics) as a extraction target (importance calculation target) (Step 94).

For example, the CPU 11 treats independent words such as nouns, verbs, adjectives, and adjective verbs as extraction targets while processing is performed such that attached words such as auxiliary verbs and postpositions and punctuation marks such as "!", "?", or the like are not treated as extraction targets. In the example of FIG. 8, the morphemes such as "sakura (cherry blossoms)" (noun), "yayoi (March)" (noun), and "miwata (overlook)" (verb) are treated as extraction targets while morphemes "no (of)" (postposition), "kagiri (as far as)" (postfix), and "ru" (auxiliary verb) are excluded from the extraction target.

Then, the CPU 11 performs weighting processing with the weight coefficient for each melody section of the music composition configuration information 40 (Step 95) and adds points indicating importance (i.e., a lyric importance level) to each of the expressions. In addition, the CPU 11 also performs weighting processing with the weight coefficient for each piece of overall information and adds points indicating the importance for each of the expressions (Step 96).

Here, when M represents a weight coefficient for each melody section, W represents a weight coefficient for each overall information item, and C represents the appearance frequency of an expression, the importance of the expression as an extraction target is expressed as $(M+W)\times C$.

Then, the CPU 11 determines whether the expression as the processing target has already been included in the importance table indicating the correspondence relationship between the expression and the importance (Step 97). The CPU 11 adds the importance of the expression in the importance table (Step 98) when the expression is included in the importance table (Yes) while the CPU 11 newly adds the expression and the importance thereof in the importance table (Step 99) when the expression is not included in the importance table (No).

The CPU 11 repeats the above processing until the processing is performed on all morphemes to accumulate the importance, and thus the importance table for entire lyrics can be obtained.

Referring again to FIG. 6, the CPU 11 repeats the above processing until the processing is performed on all expressions in the text unit 31 of the lyric information 30 and output the importance table (Step 67) when the processing is completed for all expressions (Yes in Step 62).

FIG. 10 is a diagram showing an example of the importance table as a result of the importance calculation processing execution for the text unit 31 of the lyric information 30 shown in FIGS. 3 and 7.

As shown in the drawing, it can be understood from the importance table 100 that the important expressions (words such as "sakura (cherry blossoms)" and "koi (in love)" in the examples of FIGS. 3 and 7) are extracted from the lyrics by executing the importance calculation processing based not only on the appearance frequency of the expressions in the lyrics but also on the music composition configuration information 40 and the overall information.

EXAMPLES

Next, description will be made of applications using the importance of each expression in the lyrics, which is calculated by the aforementioned processing.

Figure 12:
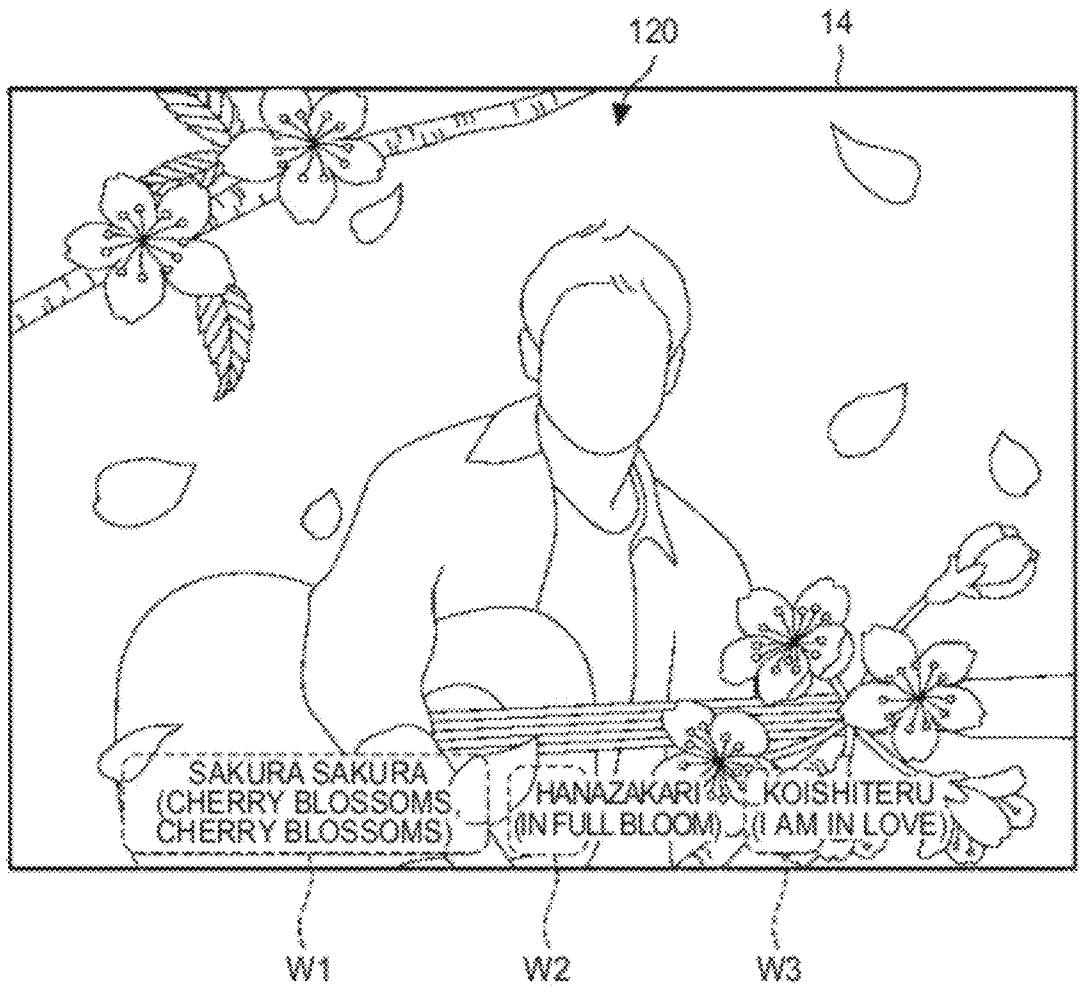
FIG. 12 is a diagram showing an execution screen for a karaoke application executed by a mobile terminal according to an embodiment of the present disclosure.

In this example, the mobile terminal 10 can execute a karaoke application and a visualizer application using the importance of each expression. FIG. 12 is a diagram showing an execution screen of the karaoke application displayed on the display 14, and FIG. 13 is a diagram showing an execution screen of the visualizer application displayed on the display 14.

While a karaoke screen in related art undifferentiatedly displays lyrics along with the progress of the reproduced music composition, the sizes of the expressions are changed and displayed in accordance with the importance of the expressions in the execution screen 120 of the karaoke application according to this example as shown in FIG. 12. For example, when each word W1 "sakura (cherry blossoms)", W2 "hana (flowers)", or W3 "koi (in love)" is extracted as an important word from among a phrase "sakura sakura hanazakari koishiteru (cherry blossoms, cherry blossoms in full bloom, I am in love)" in the lyrics by the aforementioned importance calculation processing, these words are displayed with larger sizes than the those of the other words.

With such a display, the user can get the message that the music composer desires to deliver, and thereby enjoy singing in a world of her/his own or singing while emphasizing on important expressions.

Figure 13:
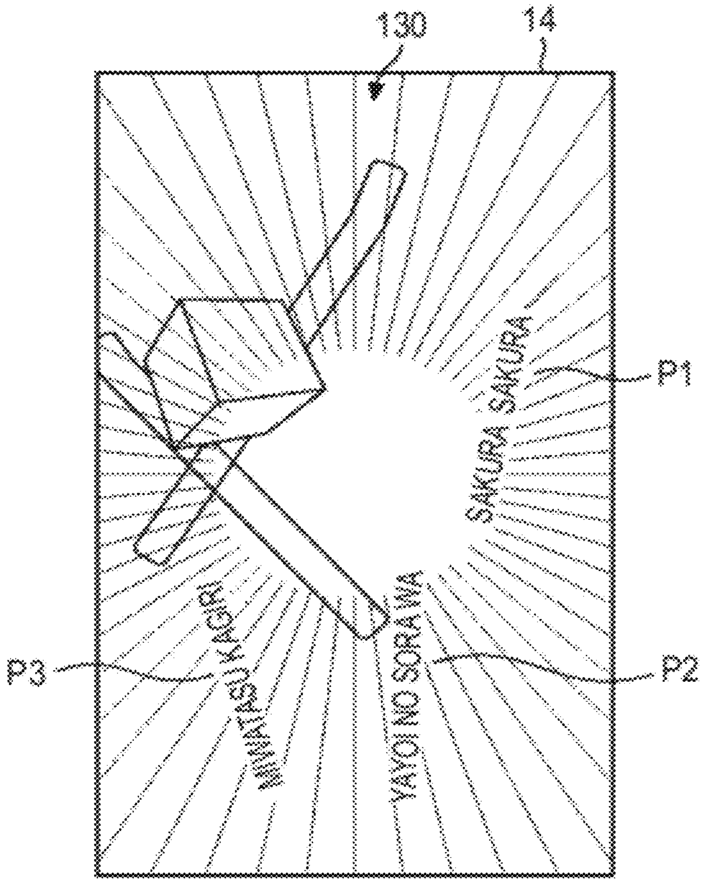
FIG. 13 is a diagram showing an execution screen for a visualizer application executed by a mobile terminal according to an embodiment of the present disclosure.

In addition, although the visualizer in related art displays various patterns and drawings (animation) along with the progress of the reproduced music composition, the lyrics are also displayed as a constituent along with the patterns and the drawings in the execution screen 130 of the visualizer application according to this example as shown in FIG. 13. At this time, a change in character sizes and addition of animation (i.e., moving images) are performed for the expressions extracted as important words in the aforementioned importance calculation processing in units of expressions and in units of phrases (lines). In the drawing, the phrase P1 of "sakura sakura (cherry blossoms, cherry blossoms)" in the first line which includes the important word "sakura" from among the lyrics in first to third lines in the lyrics shown in FIGS. 3 and 7 is displayed so as to be larger and attract attentions as compared with other phrases P2 and P3. At this time, a different animation (patterns, drawings, or modified modes thereof) from that in the case where the other phrases are displayed may be displayed.

With such display, the user can obtain the message that the music composer desires to deliver and listen to the music composition with a feeling of immersion.

Figure 11:
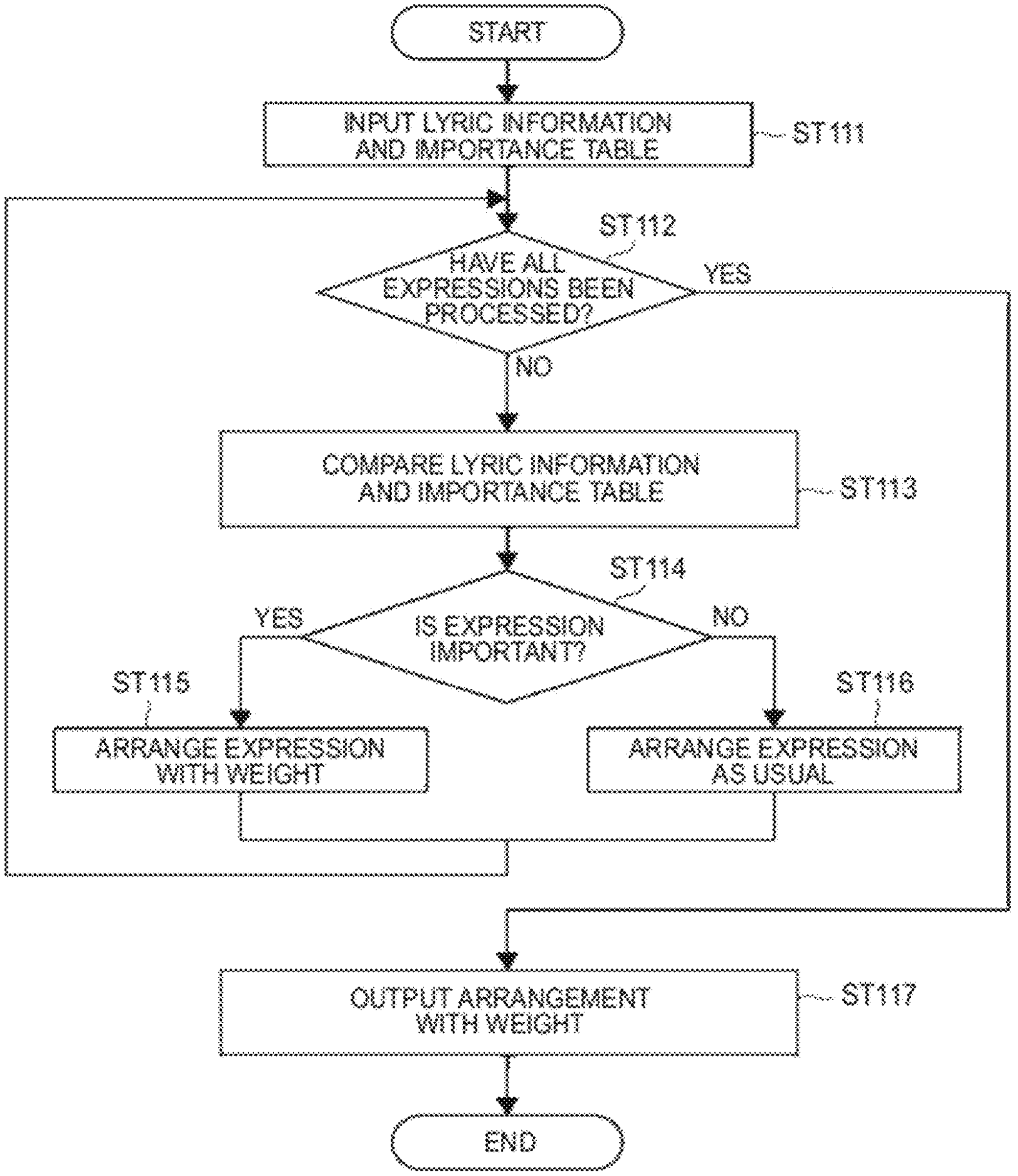
FIG. 11 is a flowchart showing an operation flow of a karaoke application and a visualizer application executed by a mobile terminal according to an embodiment of the present disclosure.

FIG. 11 is a flowchart showing operation flow of the karaoke application and the visualizer application.

As shown in the drawing, the CPU 11 firstly activates the karaoke application or the visualizer application and inputs the lyric information 30 and the importance table 100 for a music composition when the user inputs a reproduction command for the music composition (Step 111). Then, the CPU 11 determines whether or not all the expressions in the lyrics of the music composition to be processed have already been processed (Step 112).

When the processing has not been completed for all expressions (No in Step 112), the CPU 11 compares the text unit 31 in the lyric information 30 and the importance table 100 (Step 113) to determine that the words and the phrases to be treated are important expressions (Step 114).

Specifically, the CPU 11 determines the expressions with an importance which is equal to or higher than a predetermined value (i.e., a predetermined importance level) in the importance table 100 as important expressions (i.e., designated subsets of the lyrics). The predetermined value is importance 5, for example, although not limited thereto.

When the expressions to be treated are determined to be important expressions (Yes in Step 114), the CPU 11 arranges the expressions with weights in the output video signals in the karaoke application or the visualizer application (Step 115). The processing of arranging expressions with weights is a processing of increasing in sizes of the expressions in the karaoke application, and a processing of increasing the sizes of the expression (or the phrases including the same) or adding animation.

On the other hand, when it is determined that the expressions to be processed are not an important expression (No in Step 114), the CPU 11 arranges the expression on the output video signal in the karaoke application or the visualizer application as usual (Step 116).

When the CPU 11 repeats the above processing for all expressions in the lyrics of the music composition to be reproduced and completes the processing for all expressions (Yes in Step 112), the CPU 11 reproduces the music composition while outputting the expression in the arrangement with weights in each application (Step 117).

CONCLUSION

As described above, the mobile terminal 10 can extract important expression reflecting the message that the music composer desires to deliver, from the lyric information by calculating the importance of the expression with the use of the weight coefficient for each melody section according to the this embodiment. With such a configuration, the user can enjoy a music composition in a world of his/her own by the karaoke application and the visualizer application.

Modified Examples

The present disclosure is not limited to the aforementioned embodiments and various modifications can be made within the scope of the present disclosure.

Although an example in which the calculated importance of the expression is used in the karaoke application or the visualizer application was shown in the aforementioned embodiment, the application which can use the importance of the expression is not limited thereto.

Figure 14:
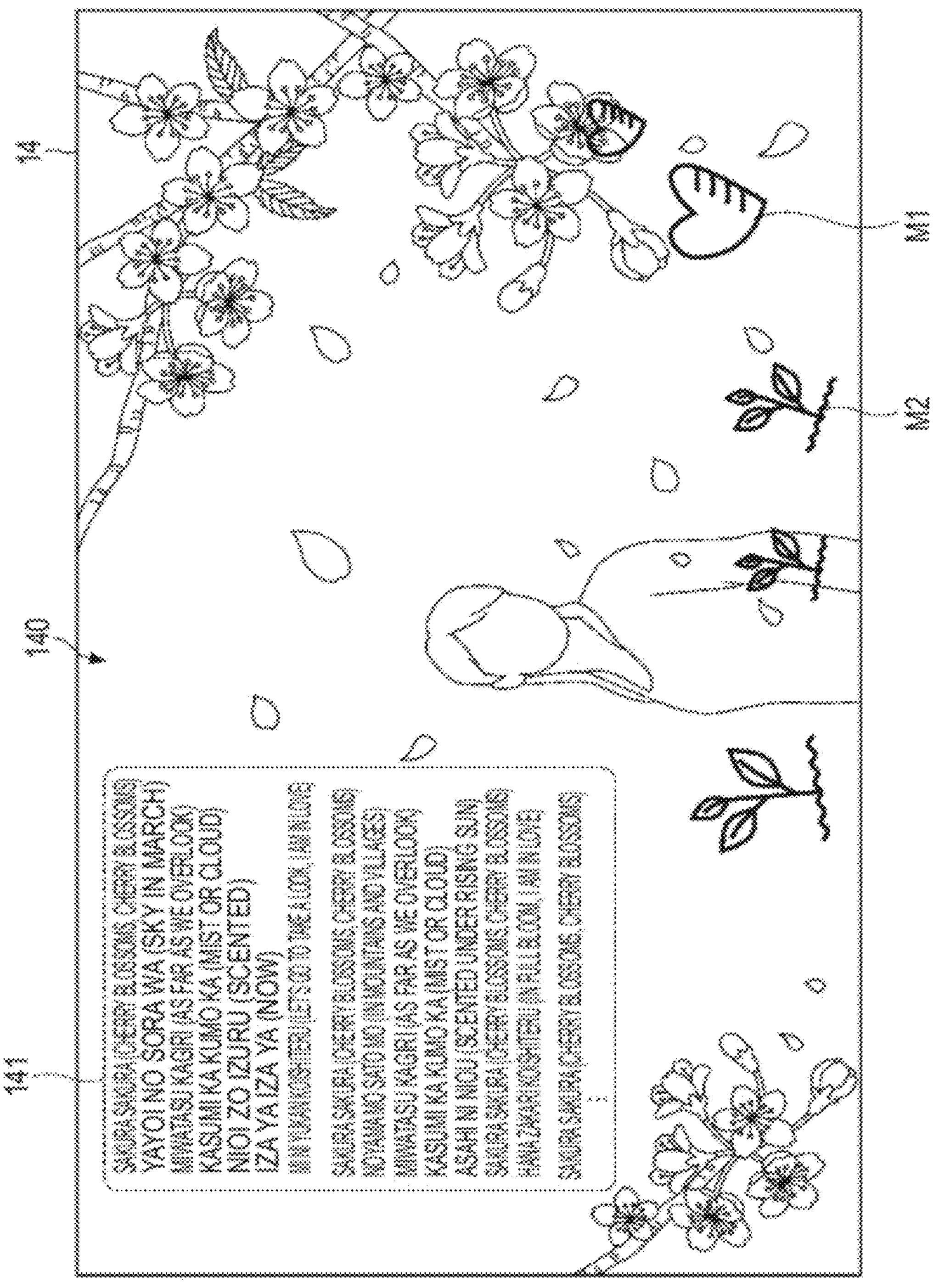
FIG. 14 is a diagram showing an example of an execution screen of a music booklet application executed by a mobile terminal according to an embodiment of the present disclosure.

As the mobile terminal 10, it is possible to realize a music booklet application with the use of the importance of the expression. FIG. 14 is a diagram showing an example of the execution screen of the music booklet application.

As shown in the drawing, the music booklet application is an application capable of arranging lyrics 141 and image parts (mark images) M on the background image in the execution screen 140 and animating them along with the progress of the reproduction of the music composition. With this application, the user can obtain the presence which the user does not enjoy with a booklet on a paper medium in related art attached to an album.

The lyrics 141 are extracted from the text unit 31 of the aforementioned lyric information 30 while the image parts M are not included in the music composition data and created corresponding to plural expressions and stored in the flash memory 13 or the like. In addition, the background image is also stored in the flash memory 13 or the like.

Figure 15A:
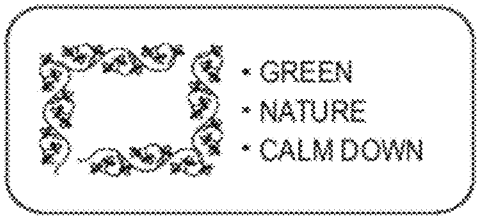
FIGS. 15A to 15D are diagrams showing examples of image parts used in the music booklet application shown in FIG. 14.
Figure 15B:
Figure 15C:
Figure 15D:

FIGS. 15A to 15D are diagrams showing examples of the image parts m used in the music booklet application. An image part imitating a plant is associated with the expressions such as "midori (green)", "shizen (nature)" and "ochitsuku (calm down) as shown in FIG. 15A, an image part imitating light (flare) is associated with the expressions such as "kagayaki (brightness)", "kosen (light beam)", and "mabushi (dazzling)" as shown in FIG. 15B. In addition, an image part indicating a heart mark s associated with the expressions such as "ai (love)", "koi (in love)" and "suki (like)" as shown in FIG. 15C, and an image part indicating water or sea is associated with the expressions such as "umi (sea)", "shinkai (ocean depth)", and "tadayo (drifting)" as shown in FIG. 15D.

In the example shown in FIG. 14, the lyrics 141 are gradually displayed along with the progress of the reproduced music composition data, and the image part M1 indicating a heart mark is displayed when the expression "koi (in love)" is displayed in the lyrics 141 while the image part M2 indicating a plant is displayed when the expression "hang (flowers)" is displayed. In such a case, it is also applicable to execute the animation in which each image part M is displaced or deformed in the screen in accordance with the beat of the music composition. It is matter of course that the image parts M and the expressions corresponding thereto are not limited to those shown in FIGS. 14, 15A to 15D.

Figure 16:
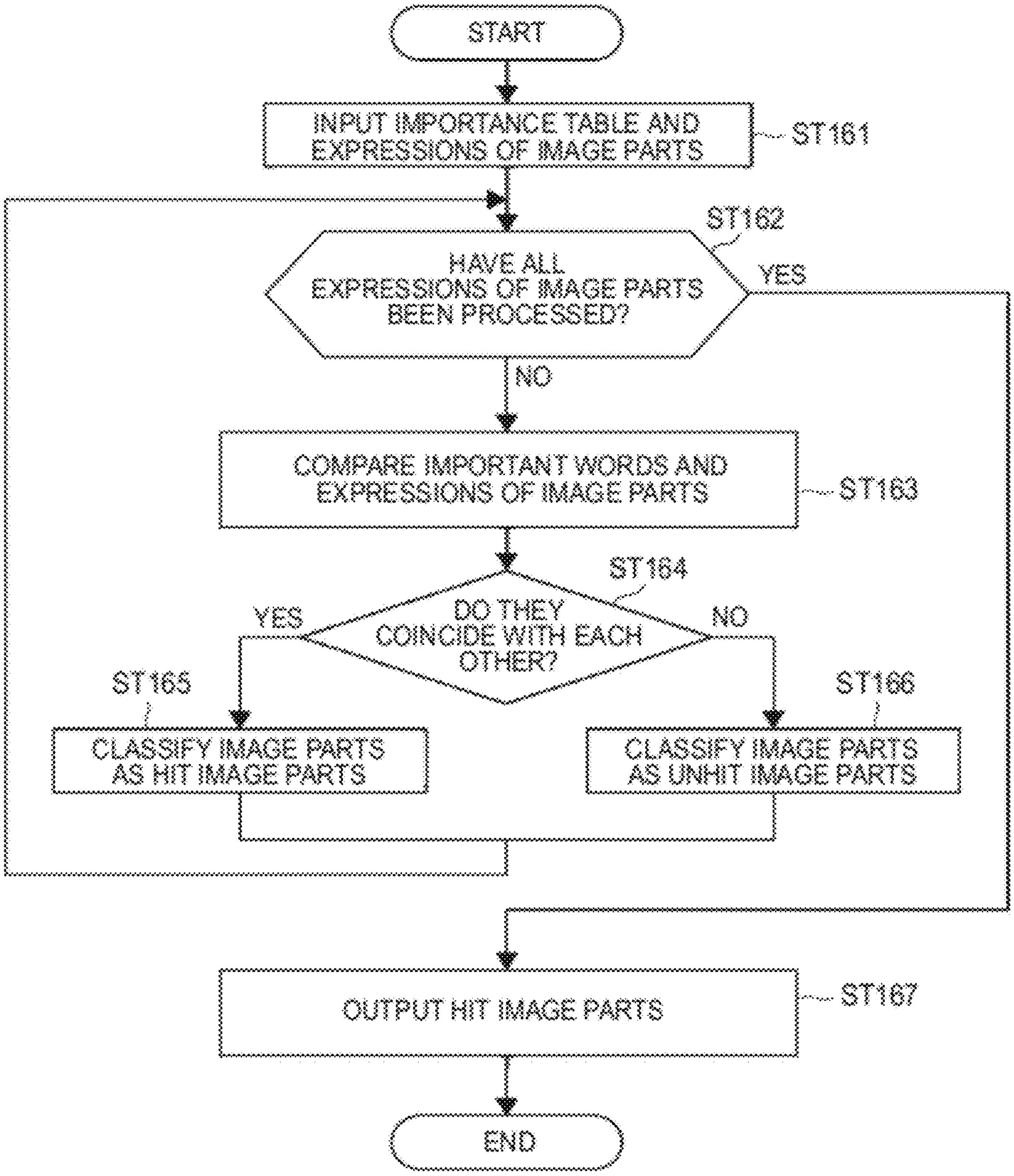
FIG. 16 is a flowchart showing an operation flow of a music booklet application executed by a mobile terminal according to an embodiment of the present disclosure.

FIG. 16 is a flowchart showing operation flow of the music booklet application executed by the mobile terminal 10.

As shown in the drawing, when a user inputs command to reproduce a music composition after the activation of the music booklet application, the CPU 11 firstly inputs an expression corresponding to each image part M in the importance table 100 (Step 161). Then, the CPU 11 determines whether or not the expressions of all image parts M have been processed (Step 162).

When it is determined that the expressions of all image parts M have not been processed (No), the CPU 11 compares the important words with an importance which is equal to or higher than the predetermined value in the importance table 100 and the expressions corresponding to the image parts M (Step 163).

When it is determined that an important word coincides with an expressions corresponding to an image part M as a result of the comparison (Yes in Step 164), the CPU 11 classifies the image part M corresponding to the expression as a hit image part (Step 165). On the other hand, when it is determined that an important word does not coincide with an expression corresponding to an image part M (No in Step 164), the CPU 11 classifies the image part corresponding to the expression as an unhit image part (Step 166).

The CPU 11 repeats the above processing for the expressions corresponding to all image parts M. when the processing has been completed for the expressions corresponding to all image parts M (Yes in Step 162), the CPU 11 reproduce the music composition data and displays the hit image parts M on the execution screen 140 of the music booklet application in accordance with the display timing of the corresponding words in the lyrics 141.

It is possible to allow a user to enjoy music compositions by obtaining and arranging image parts M which suit the feeling of the music composition with the use of the image parts M corresponding to the important words even if the image parts M and the music composition data are separated from each other according to the above processing.

Figure 17:
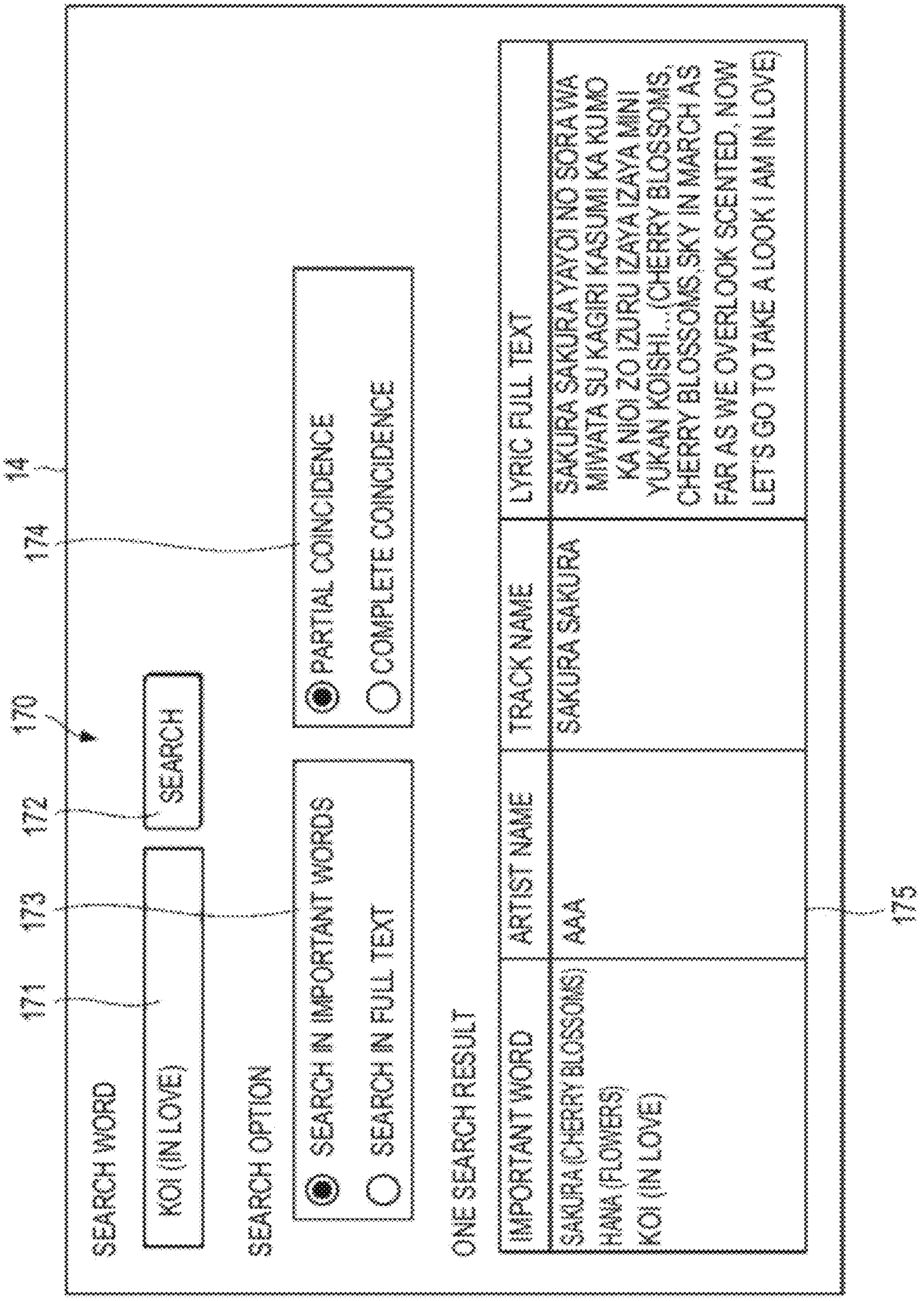
FIG. 17 is a diagram showing an example of an execution screen of a music search application executed by a mobile terminal according to an embodiment of the present disclosure.

In addition, it is also possible to realize a music composition search application with the use of the importance of the expressions for the mobile terminal 10. FIG. 17 is a'diagram showing an example of the execution screen of the music composition search application.

As shown in the drawing, the execution screen 170 of the music composition search application includes a search box 171 which receives the user's input of a search word (i.e., input data) and a search button 172 which receives the instruction of the search execution. In addition, the execution screen 170 includes an important word/full text selection box 173 which allows a user to select important words or full text as search targets with a radio button, for example, as a search option and a partial coincidence/complete coincidence selection box 174 which allows a user to select partial coincidence search or complete coincidence search with a radio button, for example. Moreover, the execution screen 170 includes a search result display field 175 which displays the search result.

The search result display field 175 displays full text of the lyrics and the important words included therein as well as an artist name and a track name (i.e., a title) of the searched music composition. The important words which partially or completely coincide with the search word are distinguished from the other important words and displayed from among the important words. In the example of the drawing, an important word "koi (in love)" coincides with a search word "koi (in love)", and therefore, the important word "koi (in love)" is displayed by bold letters in the search result display field 175.

Figure 18:
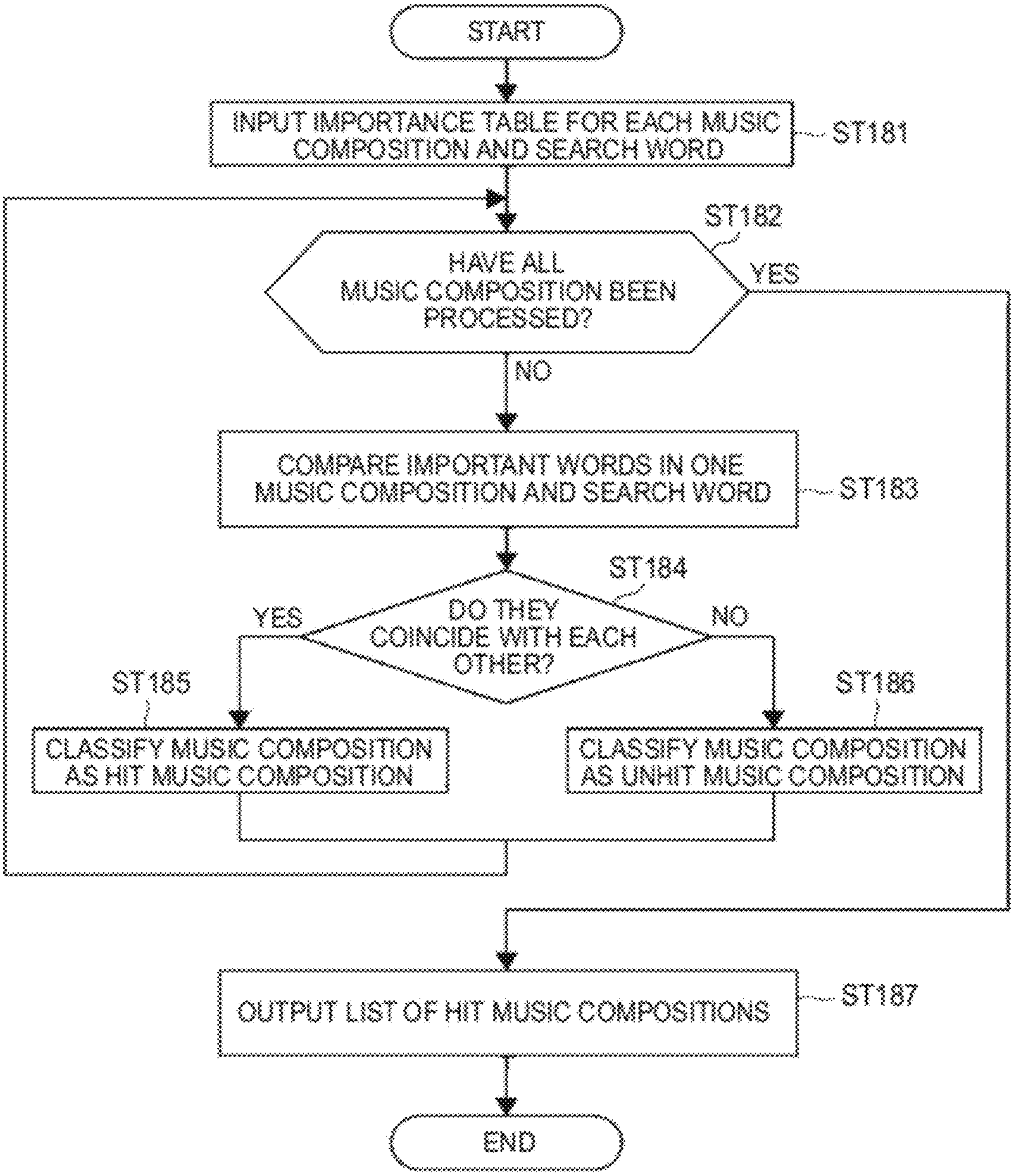
FIG. 18 is a flowchart showing an operation flow of a music search application executed by a mobile terminal according to an embodiment of the present disclosure.

FIG. 18 is a flowchart showing the operation flow of the music composition search application executed by the mobile terminal 10. The drawing shows processing in the case where the important word search is selected in the important word/full text selection box 173 in the execution screen 170 of the music composition search application.

As shown in the drawing, the CPU 11 firstly inputs the importance table 100 for each of all music compositions stored in the flash memory 13 or the like after the activation of the music composition search application and inputs a search word through the search box 171 (Step 181). Then, the CPU 11 determines whether or not all music compositions stored in the flash memory 13 or the like have been processed (Step 182).

When it is determined that the processing has not been completed for all music compositions (No), the CPU 11 compares the important words with an importance which is equal to or higher than the predetermined value in the importance table 100 with the search word for the music composition to be processed (Step 183).

When it is determined that the important words partially or completely coincide with the search word in accordance with the selection state in the partial coincidence/complete coincidence selection box 174 as a result of the comparison (Yes in Step 184), the CPU 11 classifies the music composition including the important words as hit music composition (Step 185). On the other hand, when it is determined that the important words do not coincide with the search word (No in Step 184), the CPU 11 classifies the music composition including the important words as an unhit music composition (Step 186).

The CPU 11 repeats the above processing for all music compositions and displays a list of the hit music compositions on the search result display field 175 when the processing has been completed for all music compositions (Yes in Step 182).

The user can not only perform a search with respect to the entire lyrics of a music composition but also perform a search with respect to the important words only, and therefore, it is possible to more easily find a music composition which fits a user's expectation. That is, although there is a problem in the full text search in the related art in that all music compositions which include an word "koi (in love)" even once when music compositions including "koi (in love)" in the lyrics are searched, for example, it is possible to hit only the music compositions in which the expression "koi (in love)" is made to have an important meaning in the lyrics and used according to this embodiment.

The music composition search processing by the music composition search application may be executed by the music composition distribution server. That is, it is also applicable that when the mobile terminal 10 receives the input of the search word on the execution screen 170, a search query corresponding thereto is transmitted to the music composition distribution server, processing of comparing with the important words is performed in the music composition data stored in the music composition distribution server, a list of the hit music compositions is replied to the mobile terminal 10 as a search result, and the search result display field 175 is made to display the list.

Although independent words in the hook line or the like among the melody section of the music composition configuration information 40 are set to have large weight coefficients while the punctuation marks ("?", "!", and the like) are set to have small weight coefficients, the weight coefficients for the punctuation marks may be set to be as large as those for the independent words in the hook line. This is because the punctuation marks such as "?", "!", and the like best reflect the message of the music composer. In such a case, the importance of the entire phrase including the punctuation mark may be calculated to be high.

Although the description was made of the examples in which the present disclosure is applied to a mobile terminal, the present disclosure can also be applied to any other information processing apparatuses such as a notebook PC, a desktop PC, a tablet type PC, a server apparatus, a recording/reproducing apparatus, a digital still camera, a digital video camera, a television apparatus, a game device, a car navigation apparatus, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for determining a lyric importance level, comprising:

a memory; and a processor executing instructions stored in the memory to:

acquire lyric information, the lyric information identifying:

lyrics of a song; and lyric location information indicating locations of the lyrics within the song;

acquire melody section information, the melody section information identifying:

a plurality of melody sections of the song;

melody section importance levels corresponding to the plurality of melody sections based on music feature information and morpheme analysis of each melody section of the plurality of melody sections; and melody section location information indicating locations of each melody section of the plurality of melody sections within the song;

identify, based on the lyric location information and the melody section location information, one or more melody sections corresponding to a subset of the lyrics; and determine, based on the melody section importance levels, a lyric importance level of the subset.

2. The apparatus of claim 1, wherein the location information comprises time information.

3. The apparatus of claim 1, wherein:

the subset is a first subset;

the lyric importance level is a first lyric importance level; and the processor further executes the instructions to:

identify, based on the lyric location information and the melody section location information, one or more melody sections corresponding to a second subset of the lyrics; and determine, based on the melody section importance levels, a second lyric importance level of the second subset.

4. The apparatus of claim 3, wherein the processor further executes the instructions to:

identify designated subsets of the song, the designated subsets comprising:

the first subset, if the first lyric importance level is greater than or equal to a predetermined importance level; and the second subset, if the second lyric importance level is greater than or equal to the predetermined importance level.

5. The apparatus of claim 4, wherein the processor further executes the instructions to:

display, if the designated subsets include the first subset, a first image; and display, if the designated subsets include the second subset, a second image.

6. The apparatus of claim 4, wherein the processor further executes the instructions to:

receive input data;

determine whether the input data corresponds to at least one of the designated subsets; and display, if the input data corresponds to at least one of the designated subsets, song information.

7. The apparatus of claim 6, wherein the input data corresponds to at least one of the designated subsets if at least one of the designated subsets comprises the input data.

8. The apparatus of claim 6, wherein the song information comprises at least one of a title associated with the song or an artist name associated with the song.

9. The apparatus of claim 6, wherein the song information comprises the designated subsets.

10. The apparatus of claim 9, wherein appearances of images of the designated subsets are based on whether the input data corresponds to the designated subsets.

11. The apparatus of claim 10, wherein appearances of the images of the designated subsets comprise font properties of the images of the designated subsets.

12. The apparatus of claim 1, wherein the processor further executes the instructions to:

display the lyrics, wherein an appearance of the subset is based on the lyric importance level.

13. The apparatus of claim 12, wherein the appearance of the subset comprises a size of the subset.

14. The apparatus of claim 1, wherein the processor further executes the instructions to:

display moving images corresponding to the lyrics, wherein an appearance of moving images corresponding to the subset is based on the lyric importance level.

15. The apparatus of claim 1, wherein the music feature information comprises a melody of each melody section of the plurality of melody sections.

16. A method for determining a lyric importance level using at least one processor, comprising:

acquiring lyric information using the at least one processor, wherein the lyric information identifying:

lyrics of a song; and lyric location information indicating locations of the lyrics within the song;

acquiring melody section information using the at least one processor, wherein the melody section information identifying:

a plurality of melody sections of the song;

melody section importance levels corresponding to the plurality of melody sections based on music feature information and morpheme analysis of each melody section of the plurality of melody sections; and melody section location information indicating locations of each melody section of the plurality of melody sections within the song;

identifying using the at least one processor, based on the lyric location information and the melody section location information, one or more melody sections corresponding to a subset of the lyrics; and determining using the at least one processor, based on the melody section importance levels, a lyric importance level of the subset.

17. The method of claim 16, wherein:

the subset is a first subset; the lyric importance level is a first lyric importance level; and the method further comprises:

identifying using the at least one processor, based on the lyric location information and the melody section location information, one or more melody sections corresponding to a second subset of the lyrics; and determining using the at least one processor, based on the melody section importance levels, a second lyric importance level of the second subset.

18. The method of claim 17, wherein the method further comprises:

identifying, using the at least one processor, designated subsets of the song, wherein the designated subsets comprising:

the first subset, if the first lyric importance level is greater than or equal to a predetermined importance level; and the second subset, if the second lyric importance level is greater than or equal to the predetermined importance level.

19. The method of claim 16, wherein the music feature information comprises a melody of each melody section of the plurality of melody sections.

20. A non-transitory computer-readable medium storing instructions which, when executed by a computer, perform a method of determining a lyric importance level, the method comprising:

acquiring lyric information, the lyric information identifying:

lyrics of a song; and lyric location information indicating locations of the lyrics within the song;

acquiring melody section information, the melody section information identifying:

a plurality of melody sections of the song;

melody section importance levels corresponding to the plurality of melody sections based on music feature information and morpheme analysis of each melody section of the plurality of melody sections; and melody section location information indicating locations of each melody section of the plurality of melody sections within the song;

identifying, based on the lyric location information and the melody section location information, one or more melody sections corresponding to a subset of the lyrics; and determining, based on the melody section importance levels, a lyric importance level of the subset.

21. The computer-readable medium of claim 20, wherein:

the subset is a first subset;

the lyric importance level is a first lyric importance level; and the method further comprises:

identifying, based on the lyric location information and the melody section location information, one or more melody sections corresponding to a second subset of the lyrics; and determining, based on the section importance levels, a second lyric importance level of the second subset.

22. The computer-readable medium of claim 21, wherein the method further comprises:

identifying designated subsets of the song, the designated subsets comprising:

the first subset, if the first lyric importance level is greater than or equal to a predetermined importance level; and the second subset, if the second lyric importance level is greater than or equal to the predetermined importance level.

23. The non-transitory computer-readable medium of claim 20, wherein the music feature information comprises a melody of each melody section of the plurality of melody sections.

* * * * *